United States Patent [19]

Masuda et al.

[11] 3,945,689
[45] Mar. 23, 1976

[54] COMBINED LOAD-SENSING PROPORTION AND RELAY VALVE

[75] Inventors: Naosuke Masuda; Itiro Yanagawa, both of Higashimatsuyama, Japan

[73] Assignee: Jidosha Kiki Co., Ltd., Japan

[22] Filed: Oct. 21, 1974

[21] Appl. No.: 516,754

[30] Foreign Application Priority Data
Nov. 28, 1973 Japan.............................. 48-133263

[52] U.S. Cl.................................. 303/22 R; 303/40
[51] Int. Cl.[2]............................................. B60T 8/18
[58] Field of Search.... 303/22 A, 22 R, 23 A, 23 R, 303/40, 54

[56] References Cited
UNITED STATES PATENTS

| | | | |
|---|---|---|---|
| 3,285,674 | 11/1966 | Eaton..................................... | 303/40 |
| 3,376,080 | 4/1968 | Kettering et al. .................. | 303/22 R |
| 3,837,713 | 9/1974 | Masuda et al...................... | 303/22 R |

*Primary Examiner*—Duane A. Reger
*Attorney, Agent, or Firm*—McGlew and Tuttle

[57] ABSTRACT

The valve includes a main valve member having an axial exhaust passage and held in the normally closed state, and a control piston assembly for opening the valve member depending on the payload of the vehicle on which the air brake is installed. The control piston assembly comprises a control piston having a valve seat on its underside cooperable with the main valve member, a stepped piston composed of two portions with different diameters and located substantially coaxially with, and in spaced relation to, the control piston in a passage leading from an indicated-pressure inlet to the upper surface of the control piston, a valve assembly adapted to be opened and closed by the axial movement of the stepped piston to control the indicated pressure applicable to the upper surface of the control piston and to the stepped piston, and a loading spring engaging the upper end of the stepped piston, with its compressive load adjustable according to the payload of the vehicle.

3 Claims, 5 Drawing Figures

COMBINED LOAD-SENSING PROPORTION AND RELAY VALVE

FIELD AND BACKGROUND OF THE INVENTION

This invention relates to a relay valve for an air brake system which automatically controls the brake actuator pressure in accordance with the payload of the vehicle equipped with such system.

Wheels of heavy duty vehicles, such as buses, trucks, and trailers, are subjected to wide load variations depending on whether the vehicles are laden or not. Also, the ratio of the load components the front and rear wheels must bear varies sharply on braking and deceleration. For these vehicles it is necessary that adequate distribution of the braking force among the wheels be attained to avoid premature locking of some wheels and ensure the safety of the vehicles when the brake is applied.

Usually the safety of the vehicles at the time of braking has been secured in the following manner. In a conventional air brake circuit as schematically shown in FIG. 1, a brake valve $a$ gives an indicated pressure to actuate a relay valve $b$, so that air under pressure from an air reservoir $c$ is supplied to a brake actuator $d$. Vehicles using a service brake circuit of this type are equipped with pressure-regulating means in the form of a load-sensing proportion valve $e$ installed between the brake valve $a$ and the relay valve $b$. The valve $e$ senses the payload on the vehicle in terms of the distance between the upper and lower end surfaces of the suspension, regulates the indicated pressure from the brake valve on the basis of the value so sensed, and then transmits the regulated pressure to the relay valve.

SUMMARY OF THE INVENTION

It is a primary object of the present invention to provide a novel combined load-sensing proportion and relay valve which serves the dual purpose of load-sensing proportioning and relaying as performed by separate valves in an ordinary brake circuit.

As shown in FIG. 2, the relay valve $f$ according to the invention combines the load-sensing proportion valve $e$ and the relay valve $b$ in FIG. 1 and is disposed in place thereof between the brake valve $a$ and the brake actuator $d$.

In the operation of the existing air brake circuit, the differentials between the input and output pressures of the load-sensing proportion valve $e$ and the relay valve $b$ are added to the respective input pressures. Consequently, the brake actuator $d$ fails to respond quite faithfully to the indicated brake pressure. Combining the two valves into a single unit limits the total differential to only that between the input and output pressures of the relay valve.

Another object of the invention is, therefore, to provide a relay valve with reduced hysteresis.

The indicated-pressure line of the conventional air brake system, which comprises the load-sensing proportion valve $e$ and the relay valve $b$, contains a relatively large amount of air under pressure. Because air is compressible medium, the large amount of air trapped in the line means a corresponding lag in response of the brake actuator at the terminal of the brake circuit.

On the other hand, as can be seen from FIG. 2, the valve $f$ of the invention, which combines the known load-sensing proportion valve and relay valve, reduces the quantity of air present in the indicated-pressure line.

Thus, still another object of the invention is to provide a relay valve which permits rapid transmission of braking command and quick response of the brake.

The foregoing objects of the invention are realized by the relay valve constructed as follows. It comprieses a main valve member having an axial exhaust passage and normally kept closed, and a control piston assembly disposed coaxially with the valve member to open the valve according to the payload of the vehicle. The control piston assembly is made up of a control piston having a downward protrusion with a valve seat formed at its lower extremity in contact with the main valve disk, a stepped piston having two different diameters for supplying a regulated indicated pressure to the control piston, a stopper plate for restricting the downward movement of the stepped piston, the stopper plate being formed with an exhaust valve seat on the upper extremity of an upward axial protrusion, and a sub-valve normally held in the closed state in an axial passage of the stepped piston. An indicated-pressure inlet and the axial passage communicate via holes formed in the side wall of the stepped piston, and the axial passage and a regulated indicated-pressure chamber above the control piston communicate through an aperture formed in the stopper plate. When the sub-valve has been closed by a valve seat extending inwardly of the lower end of the axial passage, the pressure from the regulated indicated-pressure chamber is released to the atmosphere by way of an exhaust hole formed in the sub-valve. The stepped piston engages at its upper end, via retainer means, a loading spring whose compressive load is adjusted according to the payload of the vehicle.

Other objects, advantages and features of the present invention will become apparent from the following description when read in connection with the accompaying drawings showing a preferred embodiment of the invention as contrasted with a prior art arrangement.

DESCRIPTION OF THE PREFERRED EMBODIMENT

Figure 3:
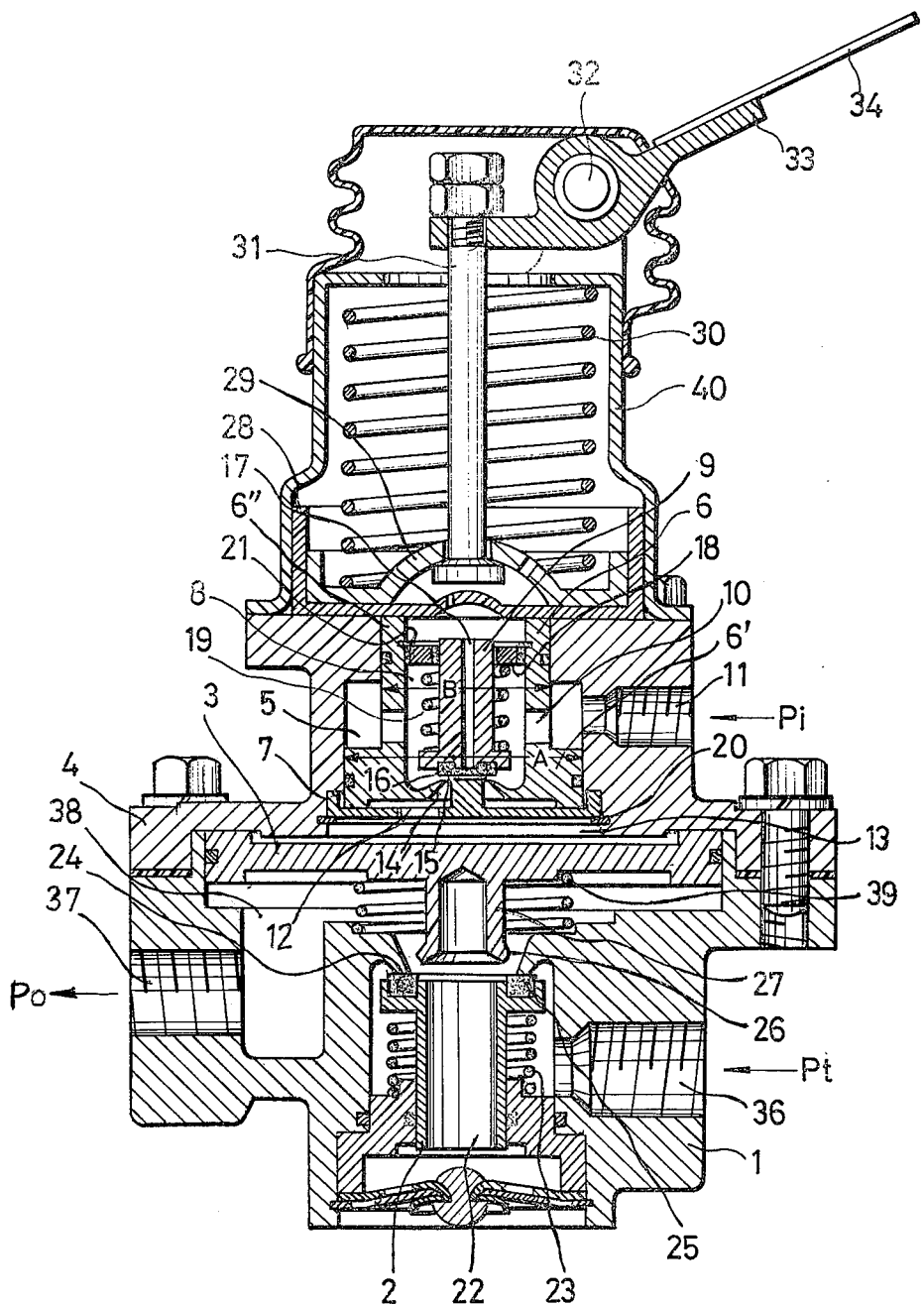
FIG. 3 is a vertical sectional view of the relay valve of the invention, showing the internal construction.

Referring now to FIG. 3, the valve body 1 is shown housing a main valve member 2 and a control piston 3. Over the valve body 1 is fitted a valve bonnet 4, solidly secured to the body by bolts and nuts. The valve bonnet 4 is formed with a relatively large chamber 5 for accommodating an indicated-pressure regulating mechanism, which consists of a stepped piston 6 having two different diameters, a stopper plate 7 for restricting the downward movement of the stepped piston 6, and a sub-valve 9 slidably fitted in an axially extending passage 8 of the stepped piston 6. An indicated-pressure inlet 11 and the chamber 5 for receiving the indicated pressure communicate with the axial passage 8 of the stepped piston 6 via holes 10 formed in the side wall of the stepped piston. The axial passage 8 connects to a regulated indicated-pressure chamber 13 through an aperture 12 of the stopper plate 7. The lower end of the axial passage 8 of the stepped piston 6 is constricted by an inwardly extended flange-like valve seat 14. Another valve seat 15 is formed at the upper end of an upward axial protrusion of the stopper plate 7. A further valve seat 16 provided at the lower end of the sub-valve 9 is normally in contact with the valve seat 15 to keep the valve open. The sub-valve 9 is formed with an axial exhaust passage 17, and is slidably held in passage 8 by means of a holder ring 18. A spring 19 is fitted between the holder ring 18 and the sub-valve 9 to urge the latter against the valve seat 15. Snap rings 20, 21 are set in position to keep the stopper plate 7 and the holder ring 18, respectively, from dropping out of the regulated indicated-pressure chamber 13 and the axial passage 8.

The main valve member 2, having an axially extending exhaust passage 22, is normally forced upward by a spring 23 and kept in contact with a valve seat 24 formed interiorly of the valve body, thus maintaining the valve in a normally closed state. A valve seat 25 of an elastic material is embedded in the upper end of the main valve member. A cooperating valve seat 26 is formed at the lower end of a downward protrusion 27 of the control piston 3, so that, when the control piston descends, the valve seat 26 comes into contact with the seat 25 to close the exhaust passage 22.

Figure 5:
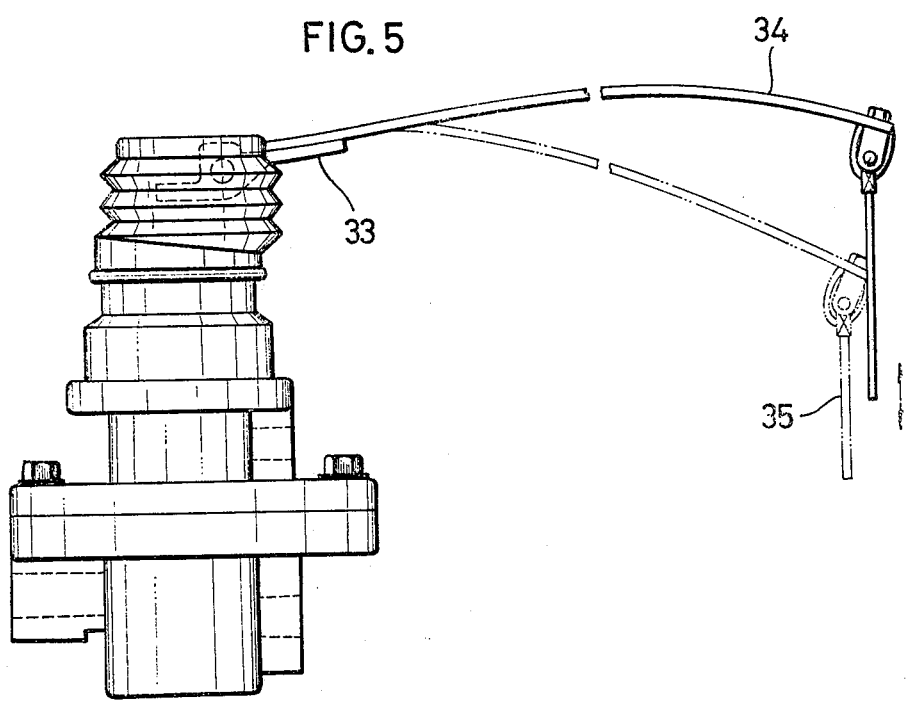
FIG. 5 is a schematic view of the relay valve as connected to a rod for mounting in a vehicle.

The upper end of the stepped piston 6 engages a loading spring 30 via a spacer 28 and a retainer 29. The loading spring 30, in turn, is connected, through retainer 29 to a tension rod 31 and a lever 33 turnable about a pivot 32. The lever 33 is connected, for example, to a suitable point of the lower part of a vehicle suspension by a leaf spring 34 and a rod or wire 35 (as shown in FIG. 5).

As regards the rest of the valve construction, the reference numeral 36 indicates a supply-pressure inlet; 37, an output-pressure outlet; 38, an output-pressure chamber; 39, a spring for normally forcing the control piston 3 upward; and 40, a casing for accommodating the loading spring 30 and the tension rod 31. The upper end of spring 30 seats on the upper end of casing 40.

With the construction described above, the combined load-sensing proportion and relay valve according to the invention operates in the following way.

Figure 1:
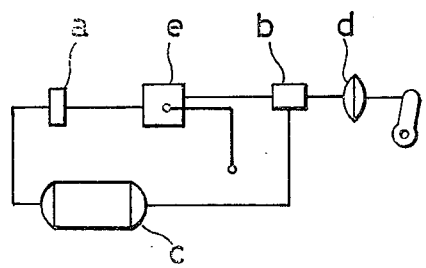
FIG. 1 is a schematic diagram of conventional air brake system.
Figure 2:
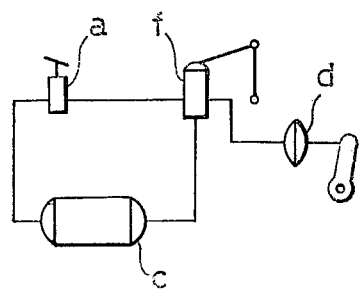
FIG. 2 is a schematic diagram of an air brake system incorporating the combined load-sensing proportion and relay valve according to the invention.

FIG. 3 shows the valve in the inoperative state. Now if the brake valve $a$ (in FIG. 2) is actuated, the resulting indicated pressure $P_i$ will be conducted through the indicated-pressure port 11, hole 10, the space around the sub-valve 9, and the aperture 12 into the regulated indicated-pressure chamber 13, where the pressure is applied on the upper end of the control piston 3. The indicated pressure will thus force the piston 3 downward, causing its downward protrusion 27 to press the main valve member 2 via the valve seat 26 and thereby open the valve.

Thereupon the supply pressure $P_t$ is introduced into the output pressure chamber 38 by way of the supply-pressure inlet 36 and the valve member 2. At the point where the downward force imparted by the indicated pressure $P_i$ that is effective on the control piston 3 is balanced with the upward force exerted by the output pressure $P_o$, the output pressure $P_o$ is obtained. At this time, the indicated pressure $P_i$ enables the stepped piston 6 to exert an upward force over a pressure-receiving area equal to the differential between the pressure-receiving areas of the large-diameter piston part 6' and the small-diameter piston part 6''. As a result, the piston 6 tends to urge the loading spring 30 upward to compress the same. However, the preset load of the loading spring 30 is so heavy that the valve seat 14 fails to close the sub-valve 9. The relationship between the indicated pressure $P_i$ and the output pressure $P_o$ in this case is represented by the straight line O-B-D in FIG. 4.

Figure 4:
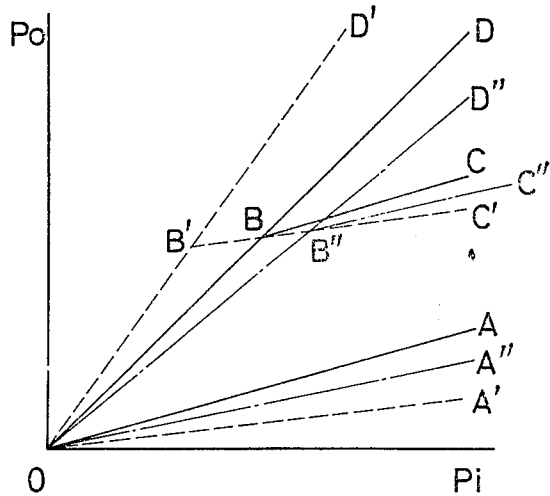
FIG. 4 is a graph showing indicated-pressure and output-pressure characteristics.

With the approach of the vehicle to a nearly unladen state, the leaf spring 34 will sag as indicated by broken lines in FIG. 4, and will thereby impart a clockwise turning force to the lever 33, forcing the tension rod 31 in a direction in which it raises the loading spring 30 and reducing the spring force to a smaller value than the preset load. If an indicated pressure $P_i$ is applied in this condition, the sub-valve 9 will remain closed as long as the indicated pressure is low. The characteristics of the indicated pressure $P_i$ and the output pressure $P_o$ in this case are represented by the line O-B in FIG. 4. With a further rise of the indicated pressure, the upwardly acting force of the stepped piston 6 increases till it overcomes the compressive spring force of the loading spring 30, so that the stepped piston 6 moves upward, bringing the valve seat 14 into contact with the valve seat 16 of the sub-valve 9 to shut off the passage for the indicated pressure $P_i$. This point corresponds to the point B in FIG. 4.

A slight increase of the indicated pressure $P_i$ from the level just stated will bring it above the regulated pressure in the regulated indicated-pressure chamber 13 above the control piston 3. This moves the stepped piston 6 downward, allowing the valve seat 14 to open the valve. Again with the admission of a slight amount of the indicated pressure into the regulated-pressure chamber 13, the upward force of the piston 6 will increase to reclose the valve seat 14 and close the passage for supply of the indicated pressure.

When the indicated pressure is equal to the regulated pressure, the stepped piston 6, fitted in a stepped cylinder having two different diameters A and B, tends to move up to close the valve seat 14, because the downward force exerted by the indicated pressure is greater than the upward force exerted by the regulated pressure. Therefore, at the point where the downward and upward forces that act on the stepped piston 6 are balanced, the indicated pressure $P_i$ exceeds the regulated indicated pressure $P_i'$. Thus, where $$\frac{\pi}{4} A^2 \times P_i' = \frac{\pi}{4}(A^2 - B^2)P_i, A^2 > A^2 - B^2$$

hence $$P_i > P_i'.$$

For the reason stated above, the output pressure $P_o$ is governed by the balance between the regualted indicated pressure $P_i'$, and the indicated pressure $P_i$ on the control piston 3. The line B-C in FIG. 4 represents the relationship between the indicated pressure $P_i$ and the output pressure $P_o$ in such a balanced state of forces.

A decrease in the indicated pressure $P_i$ reduces the downward force of the stepped piston 6. As a consequence, the stepped piston moves upward, bringing the valve seat 14 into contact with the valve seat 16 of the sub-valve 9 and thereby raising the sub-valve 9, too. The valve seat 16 of the sub-valve 9 then moves away from the valve seat 15 of the stopper plate 7 to open the exhaust passage 17 of the sub-valve. This releases the regulated indicated pressure $P_i{'}$ from the regulated indicated pressure chamber 13 into the atmosphere by way of the exhaust passage 17. On the other hand, the control piston 3 is moved upward by the action of the spring 39 and the output pressure $P_o$, with the result that the valve seat 26 at the lower end of the downward protrusion moves away from the main valve member 2. Next, the main valve member 2, also, is raised by the action of the spring 23 and the supply pressure $P_t$, so that the valve seat 25 comes into contact with the valve seat 24 of the valve body to close the passage of the supply pressure. At the same time, the output pressure is released to the atmosphere through the exhaust passage 22 of the main valve member 2.

The spring force of the loading spring 30, which governs the point B in FIG. 4, may be varied over the line O-D in the same figure by the variable load regulating mechanism consisting of the tension rod 31, lever 33, and leaf spring 34, or according to the payload of the vehicle. Also, the gradient O-D may be set differently as desired, for example to O-D' or O-D'', by changing the ratio of the regulated-pressure acting area to the output-pressure acting area of the control piston 3. Similarly, the gradient B-C (O-A) may be freely set, for example to B'-C' (O-A') or B''-C'' (O-A''), by changing the raio of the indicated pressure acting area to the regulated-pressure acting area of the stepped piston 6.

From the foregoing description it will be understood that, when using the relay valve according to the invention, its characteristics can be diversely varied by suitably choosing and setting the output-pressure acting area and the regulated indicated-pressure acting area of the control piston, the indicated-pressure acting area and the regulated indicated-pressure acting area of the stepped piston, and the tension of the loading spring.

The loading spring 30 is preset to a given compressive force, and the variable load regulating mechanism is so disposed as to reduce the spring force. Should the variable load regulating mechanism be broken, the preset spring force would force the stepped piston down to keep the sub-valve open. In such an event, the relay valve of the invention functions substantially like a conventional relay valve, and there is no danger of the braking force becoming insufficient.

What is claimed is:

1. A combined load-sensing proportion and relay valve for an air brake circuit comprising a valve body formed with a supply pressure inlet for connection to a source of air under pressure, an operating pressure outlet for connection to the air brakes, and an indicated pressure inlet for connection to a brake valve; a main valve member mounted in said body for axial displacement therein and controlling communication between said supply pressure inlet and said operating pressure outlet, said main valve member being formed with an axial exhaust passage therein; means normally biasing said main valve member to a closed state blocking communication between said supply pressure inlet and said operating pressure outlet; said body being formed with an outlet pressure chamber communicating with said outlet pressure outlet and with an indicated pressure chamber communicating with said indicated pressure inlet; control piston means for opening said main valve member in dependence on the pay load of the vehicle on which the air brake circuit is installed; said control piston means including a control piston mounted for axial displacement in said outlet pressure chamber and having, on its underside, a valve seat cooperable with said main valve member, a stepped piston mounted for axial displacement in said indicated pressure chamber and formed with two coaxial portions with respective different diameters, said stepped piston being located substantially coaxially with, and in spaced relation to, said control piston; said body being further formed with a regulated indicated pressure chamber defined in part by the upper surface of said control piston; said control piston means further including valve means adapted to be opened and closed by axial movement of said stepped piston to control the indicated pressure applied to the upper surface of said control piston and to said stepped piston, and loading compression spring means engaging the upper end of said stepped piston and having its compressive force adjustable in accordance with the pay load of the vehicle; said stepped piston being formed with an axial passage therethrough communicating with said indicated pressure inlet through a radial opening into said indicated pressure chamber; said valve means comprising a valve seat flanged inwardly of the lower end of said axial passage through said stepped piston; an apertured stopper plate interposed between said control piston and said stepped piston and limiting movement of said stepped piston toward said control piston, said stopper plate having an upwardly extending axial protrusion formed with an exhaust valve seat on its upper end and cooperating with said inwardly flanged valve seat to control communication between said indicated pressure chamber and said regulated indicated pressure chamber which latter is located between said control piston and said stepped piston; a sub-valve mounted for axial displacement in said axial passage through said stepped piston and cooperable with said inwardly flanged valve seat and said valve seat on the upper end of said protrusion; said inwardly flanged valve seat being formed in the larger diameter lower portion of said stepped piston and said radial aperture being formed in the smaller diameter upper portion of said stepped piston and means normally biasing said sub-valve to an open state relative to said inwardly flanged valve seat of said stepped piston.

2. A combined load-sensing proportion and relay valve, as claimed in claim 1, including a casing secured to the upper surface of said valve body and enclosing said loading spring means, and having an upper end wall; said loading spring means comprising a retainer cooperable with the upper end of said stepped piston, a tension rod extending substantially axially of said casing and having its lower end connected to said retainer, a loading spring engaged with said retainer and with the upper end wall of said casing, a lever pivotally mounted on the upper end of said casing and having one end connected to the upper end of said tension rod, and a leaf spring connected to the other end of said lever.

3. A combined load-sensing proportion and relay valve, as claimed in claim 2, in which said loading spring is disposed, in a pre-loaded state, between said retainer and the upper end wall of said casing.

* * * * *